Patented Mar. 4, 1947

2,416,965

UNITED STATES PATENT OFFICE 2,416,965

ISOMERIZATION OF TETRALIN

Charles L. Thomas and Herman S. Bloch, Riverside, Ill., assignors to Universal Oil Products Company, Chicago, Ill., a corporation of Delaware No Drawing. Application April 5, 1944, Serial No. 529,682

8 Claims. (Cl. 260—668)

This invention relates to the isomerization of tetrahydronaphthalene and is more specifically concerned with the use of selected catalysts and operating conditions for accomplishing this isomerization reaction.

The hydrocarbon tetrahydronaphthalene or as more commonly termed "tetralin" is ordinarily obtained from hydrocarbon oils or by the hydrogenation of naphthalene produced in coal tar distillation operations. The principal use of tetralin at the present time is as a solvent in varnishes and lacquers. Its physical properties, in particular its high solvent power, makes it very suitable for use in these materials.

Isotetralins such as $\alpha$-methylindane or $\beta$-methylindane because of their inherent physical properties are very valuable as solvents in varnishes and lacquers. These isomers have boiling points considerably lower than that of tetralin and because of their increased volatility produce quicker drying varnishes and lacquers than those having the tetrahydronaphthalene incorporated therein.

No extensive use has been made of these materials as solvents because of the limited supply available and the lack of a simple and efficient method of producing these compounds from more abundant materials.

It is an object of this invention to provide a simple and economical method for converting tetrahydronaphthalene to the more valuable isotetralins such as $\alpha$ or $\beta$-methylindane.

A feature of the present invention is the use of catalytic materials which are suitable for directing and accelerating the desired reaction. Broadly speaking, the catalytic materials which may be employed are associations of the refractory oxides or fluorides of aluminum, zirconium, magnesium, thorium and boron. More specifically, the catalysts are alumino-silicate clays having molal ratios of silica to alumina of 3:1 or higher, either as such or after being activated by acid treatment, aluminum fluoride hemihydrate, magnesium fluoride, alumina-boria and synthetic composites of silica with at least one of the oxides of the following elements: aluminum, zirconium, magnesium, thorium and boron.

In one embodiment the present invention comprises the isomerization of tetralin to isomeric tetralins by subjecting said tetralin under isomerization conditions to the action of a catalyst comprising an association of at least two compounds selected from the group consisting of the refractory oxides and fluorides of aluminum, zirconium, magnesium, thorium and boron.

The synthetic catalysts, in particular those comprising associations of silica with at least one other refractory oxide, may be prepared by separately forming the hydrogels and compositing these hydrogels in the desired proportion, or may be formed by preparing a single hydrogel, for example, silica hydrogel, and incorporating the refractory oxides thereon by contacting said hydrogel with a solution of a soluble salt followed by precipitation of the hydrated oxide and drying and calcining the mass to form an association of the refractory oxides. Alternatively, a purified silica hydrogel may be formed and contacted with a decomposable salt, for example, aluminum or zirconium nitrates followed by heating to incorporate alumina and/or zirconia thereon.

The catalyst may be also prepared by simultaneously precipitating the hydrogels of two or more of the refractory oxides followed by drying and calcining to form the desired catalyst composite.

A particularly suitable catalyst comprises an association of silica and alumina prepared in the following manner: a silica hydrogel is formed by mixing a solution of a soluble silicate such as water glass with an acid, purifying the resulting silica hydrogel by washing with acidified water or solutions of ammonium salts or multivalent salts to effect a displacement of the alkali metal ion, contacting said purified hydrogel with a solution of a soluble aluminum salt, precipitating the alumina on the silica hydrogel by the addition of a volatile basic precipitant such as ammonium hydroxide or ammonium carbonate, and heating and drying the resulting composite. A silica-alumina catalyst may be prepared by a similar method with the exception that the purification is effected after the alumina has been precipitated on the silica hydrogel. In this latter method of preparation, there is no necessity to limit the precipitant to a volatile basic precipitant since any alkali metal ions which may be incorporated into the composite by the use of a basic precipitant, such as sodium hydroxide, sodium carbonate, potassium hydroxide or potassium carbonate, will be removed in a subsequent purification treatment. The purified composite may then be dried and calcined at temperatures within the approximate range of about 300 to about 600° C.

It is not intended that the catalytic materials recited above be considered equivalent in their ability to accelerate the desired reaction in the process of the present invention. The activity of these catalytic materials will be somewhat dependent upon the composition and also upon the method of preparation employed.

The operating conditions such as temperatures, pressures and space velocities which may be satisfactorily employed fall within the following general broad ranges. The particular temperature and pressure selected for any operation will be dependent to a certain extent upon the catalyst being employed and the extent of conversion desired. Temperatures of the order of about 300° C. to about 600° C., pressures below about 100 pounds per square inch, and space velocities in excess of 0.25 measured as volumes of liquid charge per volume of catalyst per hour have been found to give satisfactory results.

In accordance with the present invention, the catalyst may be conveniently utilized as filling material in tubes or chambers in the form of small pellets or granules in fixed bed relationship to the incoming reactants or in the finely divided state in a "fluidized" or "compact bed" type of operation.

In the "fluidized" operation, the charge is passed upwardly through a body of finely divided catalysts causing the catalyst particles to be motionalized and forming a fluid-like mass. The catalyst is continuously withdrawn from the reaction zone, regenerated and returned thereto.

In the "moving bed" type of operation, the compact bed may be continuously passed through the reaction zone concurrently or countercurrently to the incoming reactants and passed therefrom into a regeneration zone from which it is returned to the reaction zone after having been regenerated by the combustion of the carbonaceous materials deposited thereon during the conversion reaction.

Another alternative mode of operation comprises suspending the catalyst in a stream of charge and treating said suspension under suitable conditions of temperature and pressure to produce the desired conversion reaction.

After passage of the charge through the catalyst, the products are separated into the desired fractions of isotetralins, lower boiling hydrocarbons and unconverted tetralins, the latter material being recycled to the reaction zone.

The catalysts employed in the process of the present invention possess a large total contact surface corresponding to the desirable porosity, the pores of the catalyst particles being of such size and shape that they do not become clogged with carbonaceous deposits after a long period of service and therefore are not difficult to reactivate by oxidation. This structure is also retained after many alternate periods of use and reactivation as evidenced by the fact that the catalyst may be repeatedly reactivated by passing air or other oxidizing gas over the spent particles to burn over deposits of carbonaceous materials at temperatures above 800° F., without apparently affecting the catalyst activity.

The following example is given to indicate the novelty and utility of the present invention but it is not intended that the invention be limited to exact agreement with the data hereinafter introduced.

The charging stock employed in the following example is commercial tetralin which was redistilled in vacuum in a ten inch Vigreux column at the rate of about one ml. per minute. The fraction employed distilled at 77–80° C. at 10 mm. pressure (199–203° C. uncorrected at atmospheric pressure) and had an index of refraction measured at 20° C. of 1.5432. This charging stock was introduced into a reaction zone containing a synthetically prepared silica-alumina-zirconia catalyst disposed within said reaction zone in fixed bed relationship to the incoming reactants. The operating conditions employed and the results obtained are given in the table presented below:

EXAMPLE

Operating conditions

| | |
|---|---|
| Temperature, °C | 500 |
| Liquid hourly space velocity | 3.8 |
| Pressure | Atmospheric |

Products—Weight percent of charge

| | |
|---|---|
| Olefins | 0.09 |
| Paraffins | 1.0 |
| Cycloparaffins | 7.0 |
| Benzene | 6.8 |
| Toluene | 2.4 |
| Ethyl benzene-xylenes | 2.6 |
| Propylbenzene and isomers | 1.2 |
| Butylbenzene and isomers | 6.7 |
| Isotetralins | 10.0 |
| Unconverted tetralin | 34.21 |
| Naphthalene | 28 |

We claim as our invention:

1. A process for producing methylindane which comprises subjecting tetralin at a temperature of from about 300° C. to about 600° C., a pressure below about 100 pounds per square inch, and a liquid hourly space velocity in excess of 0.25 to the action of a catalyst comprising an association of at least two compounds selected from the group consisting of silica, alumina, zirconia, magnesia, thoria, and boria.

2. A process for producing methylindane which comprises subjecting tetralin at a temperature of from about 300° C. to about 600° C., a pressure below about 100 pounds per square inch, and a liquid hourly space velocity in excess of 0.25 to the action of a catalyst comprising an aluminosilicate clay having a molal ratio of silica to alumina of at least 3:1.

3. A process for producing methylindane which comprises subjecting tetralin at a temperature of from about 300° C. to about 600° C., a pressure below about 100 pounds per square inch, and a liquid hourly space velocity in excess of 0.25 to the action of a catalyst comprising silica and alumina.

4. A process for producing methylindane which comprises subjecting tetralin at a temperature of from about 300° C. to about 600° C., a pressure below about 100 pounds per square inch, and a liquid hourly space velocity in excess of 0.25 to the action of a catalyst comprising silica, alumina and zirconia.

5. A process for producing methylindane which comprises subjecting tetralin at a temperature of from about 300° C. to about 600° C., a pressure below about 100 pounds per square inch, and a liquid hourly space velocity in excess of 0.25 to the action of a catalyst comprising alumina and boria.

6. An isomerization process for the production of methylindane which comprises contacting tetralin with a catalyst comprising an association of at least two compounds selected from the group consisting of silica, alumina, zirconia, magnesia, thoria, and boria at a temperature of from about 300° C. to about 600° C., a pressure below about 100 pounds per square inch, and a liquid hourly space velocity in excess of 0.25, and separating from the resultant reaction products a lower boiling isomer of said tetralin comprising a methylindane.

7. The process of claim 6 wherein said isomer comprises alpha methylindane.

8. The process of claim 6 wherein said isomer comprises beta methylindane.

CHARLES L. THOMAS.
HERMAN S. BLOCH.

REFERENCES CITED

The following references are of record in the file of this patent:

UNITED STATES PATENTS

| Number | Name | Date |
|---|---|---|
| 2,296,395 | Michael et al. | Sept. 22, 1942 |

FOREIGN PATENTS

| Number | Country | Date |
|---|---|---|
| 406,808 | British | Mar. 8, 1934 |

OTHER REFERENCES

Sundgren, Ann. Comb. Liquides, vol. 5, 57–74 (1930). (Patent Office Library.)

Ipatieff et al., Berichte, vol 62, 593–7 (1929). (Patent Office Library.)

Jones, Jour. Chem. Soc., vol. CVII, 1582–3 (1915). (Patent Office Library.)